United States Patent
Laddu (10) Patent No.: US 12,212,408 B2
(45) Date of Patent: Jan. 28, 2025

(54) SECURING DOWNLINK CONTROL INFORMATION IN CELLULAR COMMUNICATION NETWORKS

(71) Applicant: Nokia Technologies Oy, Espoo (FI)

(72) Inventor: Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 277 days.

(21) Appl. No.: 17/762,434

(22) PCT Filed: Sep. 30, 2019

(86) PCT No.: PCT/EP2019/076374
§ 371 (c)(1),
(2) Date: Mar. 22, 2022

(87) PCT Pub. No.: WO2021/063470
PCT Pub. Date: Apr. 8, 2021

(65) Prior Publication Data
US 2022/0399950 A1    Dec. 15, 2022

(51) Int. Cl.
*H04K 3/00* (2006.01)
*H04W 72/1273* (2023.01)

(52) U.S. Cl.
CPC ........ *H04K 3/825* (2013.01); *H04W 72/1273* (2013.01)

(58) Field of Classification Search
CPC .......................... H04K 3/825; H04W 72/1273
See application file for complete search history.

(56) References Cited

U.S. PATENT DOCUMENTS

| | | | |
|---|---|---|---|
| 2014/0204766 A1* | 7/2014 | Immendorf | H04W 24/04 370/242 |
| 2014/0206279 A1* | 7/2014 | Immendorf | H04K 3/42 455/1 |
| 2014/0349568 A1* | 11/2014 | Niemela | H04K 3/22 455/1 |
| 2015/0188662 A1* | 7/2015 | Shapira | H04K 3/43 455/1 |
| 2017/0289108 A1* | 10/2017 | Lee | H04W 76/27 |
| 2018/0167369 A1 | 6/2018 | Shapira | |
| 2019/0082457 A1 | 3/2019 | Zhou et al. | |
| 2019/0181974 A1* | 6/2019 | Ju | H04K 3/43 |

\* cited by examiner

*Primary Examiner* — Junpeng Chen
(74) *Attorney, Agent, or Firm* — Lippes Mathias LLP (57) ABSTRACT

According to an example aspect of the present invention, there is provided a method including determining at least one possible downlink control information for the user equipment to schedule the data transmission, checking a scrambled version of the at least one possible downlink control information to determine whether the scrambled version of the at least one possible downlink control information defines valid downlink control information, transmitting the scrambled version of the at least one possible downlink control information and scheduling the data transmission based on the at least one possible downlink control information and if it is determined that the scrambled version of the at least one possible downlink control information defines valid downlink control information, scheduling the jamming transmission based on the scrambled version of the at least one possible downlink control information.

20 Claims, 7 Drawing Sheets

SECURING DOWNLINK CONTROL INFORMATION IN CELLULAR COMMUNICATION NETWORKS

CROSS REFERENCE TO RELATED APPLICATION

This patent application is a U.S. National Stage application of International Patent Application Number PCT/EP2019/076374 filed Sep. 30, 2019, which is hereby incorporated by reference in its entirety.

FIELD

Various example embodiments relate in general to cellular communication networks and more specifically, to securing downlink control information in such networks.

BACKGROUND

Downlink control information is required in various cellular networks, such as, in networks operating according to Long Term Evolution, LTE, and/or 5G radio access technology, to inform User Equipments, UEs, at least about their resource assignments. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. One of the topics in the 3GPP discussions is security and as downlink control information informs UEs about their resource assignments, there is a need to provide improved methods, apparatuses and computer programs to secure downlink control information in wireless networks.

SUMMARY OF THE INVENTION

According to some aspects, there is provided the subject-matter of the independent claims. Some embodiments are defined in the dependent claims. The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided a first method. The first method may be for a base station, for using a single downlink control channel transmission to schedule a data transmission for a user equipment and a jamming transmission for an eavesdropper, the first method comprising, determining at least one possible downlink control information for the user equipment to schedule the data transmission, checking a scrambled version of the at least one possible downlink control information to determine whether the scrambled version of the at least one possible downlink control information defines valid downlink control information, transmitting the scrambled version of the at least one possible downlink control information and scheduling the data transmission based on the at least one possible downlink control information and if it is determined that the scrambled version of the at least one possible downlink control information defines valid downlink control information, scheduling the jamming transmission based on the scrambled version of the at least one possible downlink control information.

In some embodiments, the scrambled version of the at least one possible downlink control information may indicate at least a resource assignment for the user equipment after descrambling and said valid downlink control information defined by the scrambled downlink control information comprises at least a resource assignment for the jamming transmission.

In some embodiments, the first method may further comprise scrambling the at least one possible downlink control information using a physical layer security key associated with the user equipment.

In some embodiments, the first method may further comprise, if it is determined that the scrambled version of the at least one possible downlink control information does not define valid downlink control information, deciding not to schedule the jamming transmission based on the scrambled version of the at least one downlink control information.

In some embodiments, the valid downlink control information may indicate at least a time and a frequency resource controlled by the base station.

In some embodiments, the first method may further comprise, if it is determined that the scrambled version of the at least one downlink control information does not indicate valid downlink control information, assigning another possible downlink control information for the user equipment, checking a scrambled version of said another possible downlink control information to determine whether the scrambled version of said another possible downlink control information defines another valid downlink control information and transmitting the scrambled version of said another possible downlink control information for the user equipment and scheduling the data transmission based on said another possible downlink control information.

In some embodiments, the first method may further comprise transmitting data to the user equipment on a resource indicated by the at least one possible downlink control information for the user equipment and transmitting a jamming message on a resource indicated by said valid downlink control information.

In some embodiments, the first method may further comprise receiving a data transmission on a resource indicated by the at least one possible downlink control information for the user equipment and identifying a security threat based on a transmission received on a resource indicated by said valid downlink control information.

In some embodiments, the first method may further comprise scrambling the at least one possible downlink control information using a first scrambling sequence to get the scrambled version of the at least one possible downlink control information and scrambling cyclic redundancy check bits of the scrambled version of the at least one possible downlink control information using a second scrambling sequence. The first method may also comprise selecting the second scrambling sequence from a set of sequences, wherein the set of sequences corresponds to a physical layer security key associated with the user equipment.

In some embodiments, the first method may further comprise changing the second scrambling sequence if the selected second scrambling sequence does not define said valid downlink control information together with the scrambled downlink control information.

In some embodiments, the first method may further comprise determining that the scrambled version of the at least one possible downlink control information for the user equipment defines valid downlink control information by identifying a possibility to schedule another transmission by the base station.

According to a second aspect of the present invention, there is provided a second method. The second method may be for a user equipment, the second method comprising, receiving a scrambled version of at least one downlink control information of the user equipment, decoding the scrambled version of the at least one downlink control information, determining that the decoded scrambled version of the at least one downlink control information provides valid downlink control information for a jamming transmission, transmitting data on a resource indicated by the at least one downlink control information and transmitting the jamming transmission on a resource indicated by said valid downlink control information.

In some embodiments, the second method may further comprise descrambling, after said decoding, the scrambled version of the at least one downlink control information to determine the at least one downlink control information.

In some embodiments, the first method may further comprise descrambling the scrambled version of at least one downlink control information of the user equipment using a physical layer security key associated with the user equipment According to a third aspect, there is provided an apparatus, for using a single downlink control channel transmission to schedule a data transmission for a user equipment and a jamming transmission for an eavesdropper, the apparatus comprising, means for determining at least one possible downlink control information for the user equipment to schedule the data transmission, means for checking a scrambled version of the at least one possible downlink control information to determine whether the scrambled version of the at least one possible downlink control information defines valid downlink control information, means for transmitting the scrambled version of the at least one possible downlink control information and means for scheduling the data transmission based on the at least one possible downlink control information and if it is determined that the scrambled version of the at least one possible downlink control information defines valid downlink control information, means for scheduling the jamming transmission based on the scrambled version of the at least one possible downlink control information. According to the third aspect, the apparatus may be a base station. The apparatus may comprise means for performing the first method.

According to a fourth aspect, there is provided an apparatus comprising means for receiving a scrambled version of at least one downlink control information of the user equipment, means for decoding the scrambled version of the at least one downlink control information, means for determining that the decoded scrambled version of the at least one downlink control information provides valid downlink control information for a jamming transmission, means for transmitting data on a resource indicated by the at least one downlink control information and means for transmitting the jamming transmission on a resource indicated by said valid downlink control information. According to the fourth aspect, the apparatus may be a user equipment. The apparatus may comprise means for performing the second method.

According to a fifth aspect of the present invention, there is provided an apparatus, for using a single downlink control channel transmission to schedule a data transmission for a user equipment and a jamming transmission for an eavesdropper, the apparatus comprising at least one processing core, at least one memory including computer program code, the at least one memory and the computer program code being configured to, with the at least one processing core, cause the apparatus at least to perform determine at least one possible downlink control information for the user equipment to schedule the data transmission, check a scrambled version of the at least one possible downlink control information to determine whether the scrambled version of the at least one possible downlink control information defines valid downlink control information, transmit the scrambled version of the at least one possible downlink control information and schedule the data transmission based on the at least one possible downlink control information, and if it is determined that the scrambled version of the at least one possible downlink control information defines valid downlink control information, schedule the jamming transmission based on the scrambled version of the at least one possible downlink control information. According to the fifth aspect, the apparatus may be a base station. The at least one memory and the computer program code may be configured to, with the at least one processing core, cause the apparatus at least to perform the first method.

According to a sixth aspect of the present invention, there is provided an apparatus comprising at least one processing core, at least one memory including computer program code, the at least one memory and the computer program code being configured to, with the at least one processing core, cause the apparatus at least to perform, receive a scrambled version of at least one downlink control information of the user equipment, decode the scrambled version of the at least one downlink control information, determine that the decoded scrambled version of the at least one downlink control information provides valid downlink control information for a jamming transmission, transmit data on a resource indicated by the at least one downlink control information and transmit the jamming transmission on a resource indicated by said valid downlink control information. According to the sixth aspect, the apparatus may be a user equipment. The at least one memory and the computer program code may be configured to, with the at least one processing core, cause the apparatus at least to perform the second method.

According to a seventh aspect of the present invention, there is provided non-transitory computer readable medium having stored thereon a set of computer readable instructions that, when executed by at least one processor, cause an apparatus to at least perform the first method.

According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

Security of downlink control information in cellular communication networks may be improved by the procedures described herein. In some embodiments of the present invention, possible downlink control information of a first User Equipment, UE, may be scrambled and the scrambled version of the possible downlink control information may be checked to make sure that the scrambled version of said possible downlink control information for the first UE defines valid downlink control information and if so, a jamming transmission may be scheduled based on the scrambled version of said possible downlink control information.

Thus, the scrambled version of the possible downlink control information may be decoded by an eavesdropper, such as a second UE. That is to say, the eavesdropper may decode the scrambled version of the possible downlink control information to identify the downlink control information associated with the jamming transmission. The eavesdropper may therefore decode a misleading resource assignment. So for example in case of downlink data transmission, a Base Station, BS, may transmit data to the first UE on a resource assigned to the first UE. The BS may also transmit the jamming transmission, such as some other data or dummy transport blocks, on a jamming resource, thereby misleading the eavesdropper. Similarly, in case of uplink data transmission, the first UE may transmit data to the BS on the resource assigned to the first UE and the jamming transmission on the jamming resource to mislead the eavesdropper.

Figure 1:
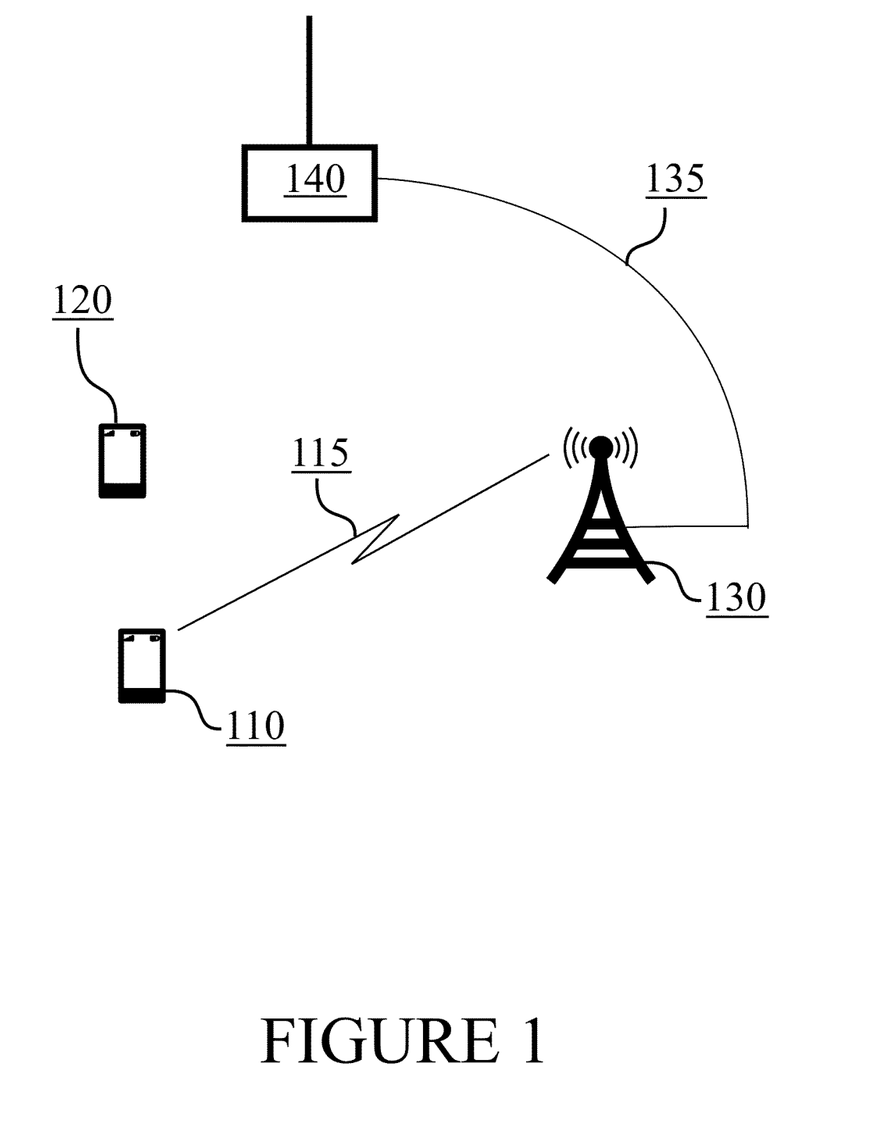
FIG. 1 illustrates an exemplary network scenario in accordance with at least some embodiments of the present invention.

FIG. 1 illustrates an exemplary network scenario in accordance with at least some embodiments of the present invention. The exemplary network scenario of FIG. 1 may comprise first UE 110, second UE 120, BS 130 and core network 140. First UE 110 and second UE 120 may comprise, for example, a smartphone, a cellular phone, a Machine-to-Machine, M2M, node, Machine-Type Communications node, an Internet of Things, IoT, node, a car telemetry unit, a laptop computer, a tablet computer or, indeed, any kind of suitable wireless user device or mobile station, i.e., a terminal.

In the exemplary network scenario system of FIG. 1, first UE 110 may be attached, or connected to, BS 130 over air interface 115 for wireless communications. BS 130 may be considered for example as a serving BS of first UE 110. Air interface 115 between first UE 110 and BS 130 may be configured in accordance with a Radio Access Technology, RAT, which both first UE 110 and BS 130 are configured to support. Air interface 115 may comprise, e.g., one or more beams between first UE 110 and BS 130.

Examples of cellular RATs include Long Term Evolution, LTE, New Radio, NR, which may also be known as fifth generation, 5G, and MulteFire. For example in the context of LTE, BS 130 may be referred to as eNB while in the context NR, BS 130 may be referred to as gNB. In any case, embodiments of the present invention are not restricted to any particular wireless technology. Instead, embodiments of the present invention may be exploited in any wireless communication system wherein it is desirable to secure downlink control information.

BS 130 may be connected, directly or via at least one intermediate node, with core network 140. BS 130 may be connected to core network 140 via wired connection 135. Core network 140 may be, in turn, coupled with another network (not shown in FIG. 1), via which connectivity to further networks may be obtained, for example via a worldwide interconnection network.

In some embodiments of the present invention, first UE 110 and BS 130 may be legitimate participants of the communication while second UE 120 may be a potential eavesdropper. That is to say, first UE 110 and BS 130 would like to communicate in a secure manner over air interface 115 while second UE 120 may try to intercept and decrypt communications between BS 130 and first UE 110, even though second UE 120 is not a legitimate receiver of said communications.

FIG. 1 shows an exemplary network scenario, wherein an eavesdropper, such as second UE 120, is trying to listen and decode the data transmissions between BS 130, such as a gNB, and first UE 110. Especially when the data transmissions between BS 130 and first UE 110 are performed over a long period of time, the feasibility of cracking down the higher layer security protocols and decoding the exact information becomes a reality.

So security of data transmissions via wireless networks remains an important issue. For instance, it is critical to guarantee that private data are accessible only to legitimate receivers, such as first UE 110, rather than eavesdroppers and impostors, such as second UE 120. In many cases, jamming and eavesdropping are two primary attacks at the physical layer of a wireless network.

In some embodiments of the present invention, BS 130 may protect downlink control channel transmissions, such as a Physical Downlink Control Channel, PDCCH, by encrypting, i.e., scrambling, the downlink control information of first UE 110. That is to say, BS 120, such as a gNB, may encrypt bits transmitted on PDCCH. In general, downlink control information may refer to Downlink Control Information, DCI, as specified for example in 3rd Generation Partnership Project, 3GPP, standard specifications.

For instance, in case of a downlink data transmission, single downlink control channel transmission, transmitted by BS 130, may be used to make sure that scrambled version of possible downlink control information schedules a downlink shared channel, such as a Physical Downlink Shared Channel, PDSCH, for first UE 110 and another downlink shared channel, such as a jamming resource, to mislead eavesdroppers, such as second UE 120. Similarly, in case of an uplink data transmission single downlink control channel transmission may be used to make sure that the scrambled version of the possible downlink control information schedules an uplink shared channel, such as a Physical Uplink Shared Channel, PUSCH, for first UE 110 and another uplink shared channel, i.e., a jamming resource, to mislead eavesdroppers, such as second UE 120.

In addition, Physical Layer Security, PLS, may be used to improve secrecy of wireless communication. PLS exploits intrinsic randomness of a transmission channel, e.g., uniqueness of a channel model between two physical positions in space and time. Physical parameters may evolve randomly on a less-than-a-second basis for example, to guarantee the security at the physical layer. PLS key to be used for encryption may be based on the transmission channel, direction of arrival/departure, transmit/receive beam index, pathloss, etc. For instance, a PLS key associated with, or of, first UE 110 may refer to a key that is derived based on the transmission channel between first UE 110 and BS 130. The PLS key of first UE 110 may be derived at both, first UE 110 and BS 130, independently, e.g., by assuming reciprocity of the transmission channel between first UE 110 and BS 130.

PLS may be used to create an extra shield of protection for example, to hinder success of various attacks. Also, PLS may be a good alternative compared to security protocols at higher levels, because a priori distribution of a security key may not be required to ensure secrecy of the communication. Thus, additional information exchange may be avoided. For instance, symmetric-key cryptosystems may be efficient in terms of computation, but such cryptosystems cause delay and decrease throughput. On the other hand, public-key algorithms may be computationally expensive and energy-consuming while causing delay and decreasing throughput as well. PLS is thus suitable, e.g., for IoT devices, because IoT devices typically have limited resources, such as processing power, communication capabilities and battery. Security of IoT devices has developed from a nice-to-have add-on for both, for embedded solutions as well as for communication standards, to a must-have due to numerous attacks, e.g., against networked cars or medical devices.

There is therefore also a need to design new and robust security protocols based on PLS. The current solutions used at the application level do not seem to be efficient and secure enough for emerging wireless communication networks, such as 5G/NR networks. PLS may be thus used as an alternative or to provide additional level of protection to formulate a well-integrated security solution together with other solutions, to efficiently safeguard confidentiality and privacy of data communications for example in 5G/NR wireless networks.

So even though embodiments of the present invention may be applied in any wireless communication system wherein it is desirable to secure downlink control information, it is recognized that at least in the context of 5G/NR there is a need to enhance security at the physical layer using PLS. For instance, at least one challenge in 5G/NR networks at the moment is that there is no solution to provide an extra level of security for data transmissions.

Some embodiments of the present invention address the above mentioned challenges by providing a security scheme, wherein uniqueness of a wireless channel and/or transmitted signal may be exploited by using PLS keys for scrambling downlink control information, thereby enabling secure communication and avoiding jamming and eavesdropping.

Figure 2:
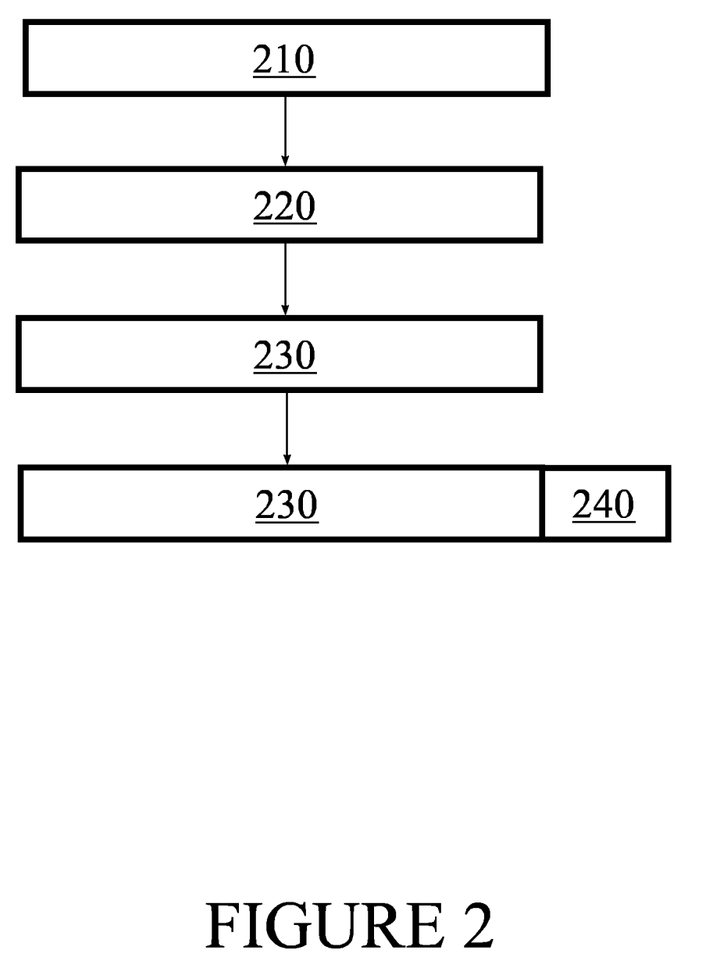
FIG. 2 illustrates securing downlink control information in accordance with at least some embodiments of the present invention.

FIG. 2 illustrates securing downlink control information in accordance with at least some embodiments of the present invention. In FIG. 2, DCI is denoted by 210, scrambling sequence generated by PLS is denoted by 220, scrambled DCI 210 is denoted by 230 and Cyclic Redundancy Check, CRC, of scrambled DCI 230 is denoted by 240. DCI 210 may be referred to as downlink control information of a user equipment, such as first UE 110, in general. Scrambling sequence generated by PLS may be referred to as a PLS key as well. In some embodiments of the present invention, scrambled DCI 230 may be referred to as a scrambled version of DCI 210.

DCI 210 may be for a subsequent downlink or uplink data transmission, such as PDSCH or PUSCH, respectively, and DCI 210 may be transmitted on PDCCH for example. In general, PDCCH may be referred to as a single downlink control channel transmission. For transmission of DCI 210, BS 130 may use protection of data by encrypting, i.e., scrambling, DCI 210 by encrypting at least some bits transmitted on the PDCCH. DCI 210 may be referred to as a possible DCI for first UE 110 as well.

Using resource assignment for downlink data transmission as an example, BS 130 may use DCI 210 of first UE 110 and scramble DCI 210 using a PLS key associated with UE 110. That is to say, DCI 210 may be scrambled by BS 130 using scrambling sequence generated by PLS 220, wherein scrambling sequence generated by PLS 220 is available at UE 110 and BS 130. BS 130 may hence generate scrambled DCI 230 based on DCI 210 and scrambling sequence generated by PLS 220.

Upon generating scrambled DCI 230, BS 130 may generate CRC 240 by calculating a CRC value over scrambled DCI 230. Moreover, BS 130 may attach CRC 240, such as distributed CRC in NR, to scrambled DCI 230 and encode scrambled DCI 230 along with CRC 240. As CRC 240 may be attached to scrambled DCI 230, both first UE 110 and second UE 120 may calculate a CRC value upon receiving scrambled DCI 230 along with CRC 240, and determine that CRC has passed if decoding of scrambled DCI 230 was successful, i.e., the calculated CRC value corresponds to CRC 240.

In some embodiments of the present invention, BS 130 may ensure that scrambled DCI 230 provides at least one valid resource assignment, or allocation, for a jamming resource, i.e., for a jamming transmission. The jamming resource may be a combination of a time and a frequency resource, possibly controlled by BS 130. That is to say, BS 130 may determine, based on scrambled DCI 230, whether a jamming resource can be scheduled. The scrambled DCI, i.e., DCI 230 without descrambling, may indicate the jamming resource. That is to say, if an eavesdropper decodes scrambled DCI 230, without descrambling, the decoded scrambled DCI 230 may indicate the jamming resource. Upon generation of scrambled DCI 230 and determining that the jamming resource can be scheduled, BS 130 may schedule the jamming transmission based on scrambled DCI 230.

Scrambled DCI 230 may be then transmitted. So if an eavesdropper, such as second UE 120, receives scrambled DCI 230 and tries to decode it, the decoding may succeed even without descrambling. Consequently, second UE 120 may determine the resource assignment of the jamming resource based on the decoded scrambled DCI 230 and assume that a data transmission intended to, or from, first UE 110 will take place on the jamming resource.

In addition, BS 130 may ensure that scrambled DCI 230 provides other DCI fields without descrambling so that any eavesdropper, such as second UE 120, may perform successful decoding of a downlink shared channel indicated by the at least one valid jamming resource assignment. For instance, BS 130 may determine that scrambled DCI 230 provides the at least one jamming resource assignment without descrambling, e.g., by checking that decoded scrambled DCI 230 defines the at least one valid jamming resource assignment, even without descrambling by any eavesdropper. BS 130 may also transmit a downlink shared channel, such as PDSCH, on the at least one valid jamming resource, to ensure that there is at least one data transmission in a field defined by decoded scrambled DCI 230, even without descrambling. For instance, a jamming message may be transmitted on the at least one valid jamming resource instead of transmitting actual data of first UE 110.

Alternatively, or in addition, only some, but not all, fields in DCI 210 may be scrambled to get scrambled DCI 230. That is to say, only a part of DCI 210 may be scrambled using a PLS key associated with first UE 110 to generate scrambled DCI 230 and scrambled DCI 230 may hence comprise a part which is not scrambled. Thus, more flexibility may be provided to BS 130 for scheduling.

Moreover, in some embodiments of the present invention, a multi-UE scenario with security needs may be addressed. For example, BS 130 may transmit multiple scrambled DCIs wherein each scrambled DCI is associated with a different UE and scrambled with a PLS key of the UE in question. That is to say, each UE may have different DCI payload. In such a case as well, BS 130 may also ensure that the transmission of multiple scrambled DCIs defines at least one valid jamming resource assignment without descrambling, thereby saving overhead by not assigning multiple jamming resources, such as jamming PDSCHs.

Upon generating scrambled DCI 230, and possible CRC 240 as well, BS 130 may transmit two downlink shared channels, such as PDSCHs. For instance, BS 130 may transmit data to first UE 110 on a resource indicated by scrambled DCI 230 after descrambling, i.e., on a resource indicated by DCI 210. That is to say, said data may be data intended for first UE 110 and the resource indicated by scrambled DCI 230 after descrambling may be actual content of DCI 210. In addition, BS 130 may transmit a jamming message for eavesdroppers, such as second UE 120, on a resource indicated by scrambled DCI 230 without descrambling, i.e., scrambled DCI 230 which is only decoded, but not descrambled, by eavesdroppers. Thus, eavesdroppers may be misled due to the transmission of the jamming message on the jamming resource.

First UE 110 may then, upon receiving scrambled DCI 230, decode scrambled DCI 230 and descramble the decoded scrambled DCI using a PLS key associated with first UE 110. First UE 110 may thus recover the actual DCI 210 and identify the resource indicated by scrambled 230 after decoding and descrambling. Consequently, first UE 110 may receive data from BS 130 on the resource indicated by DCI 210 and for example decode a correct downlink shared channel, such as PDSCH, transmission from BS 130. That is to say, first UE 110 may communicate with BS 130 on the resource indicated by DCI 210, i.e., the descrambled DCI.

An eavesdropper, such as second UE 120, may decode scrambled DCI 230 upon receiving it from BS 130 but the eavesdropper may not be able to descramble decoded scrambled DCI 230, because the eavesdropper does not know the PLS key associated with first UE 110. In some embodiments, if CRC 240 is used, the eavesdropper may decode scrambled DCI 230 as CRC passes often if there is no error in the transmission. Thus, the eavesdropper may decode a misleading resource assignment, i.e., the resource assignment indicated by scrambled DCI 230 without descrambling, which is for the jamming resource. As BS 130 may transmit the jamming message on the jamming resource and the eavesdropper may consequently receive the jamming message. So if the eavesdropper is for example an imposter, the eavesdropper may transmit feedback, such as HARQ-ACK, for the jamming message and BS 130 may identify presence of the imposter based on the received feedback. In some embodiments, the jamming message may comprise for example transport blocks, such as dummy transport blocks.

Similar mechanism may be used for uplink data transmissions as well. In such a case, the resources indicated by DCI 210 and scrambled DCI 230 without descrambling may be uplink shared channels, such as PUSCH, resources. After reception, first UE 110 may decode and descramble scrambled DCI 230 and then, first UE 110 may transmit data to BS 130 on the resource indicated by DCI 210. That is to say, first UE 110 may communicate with BS 130 on the resource indicated by DCI 210, i.e., the descrambled DCI.

First UE 110 may also transmit a jamming message on a resource indicated by the scrambled DCI 230 without descrambling because an eavesdropper, such as second UE 120, may try to listen to transmissions of first UE 110. The eavesdropper may hence become busy with decoding of the jamming message and consequently the transmission of data to BS 130 on the resource indicated by DCI 210 becomes more secure. That is to say, first UE 110 may decode scrambled DCI 230 to determine that decoded scrambled DCI 230 provides a valid DCI for a jamming transmission and then transmit a jamming message, i.e., a jamming transmission on a resource indicated by said valid DCI. First UE 110 may further descramble decoded scrambled DCI 230, corresponding to said valid DCI, to get DCI 210.

If an eavesdropper, i.e., an imposter, tries to replace first UE 110 and BS 130 and uses the jamming resource for transmissions, such as PDSCH and PUSCH transmissions, to schedule HARQ-ACK or send retransmission requests for example, BS 130 may identify the imposter, or a threat in general, based on the received transmission on the resource indicated by scrambled DCI 230, i.e., the transmission received on the jamming resource. That is to say, BS 130 may identify a threat because there is a transmission on a resource that is not assigned for a given UE, such as first UE 110.

Figure 3:
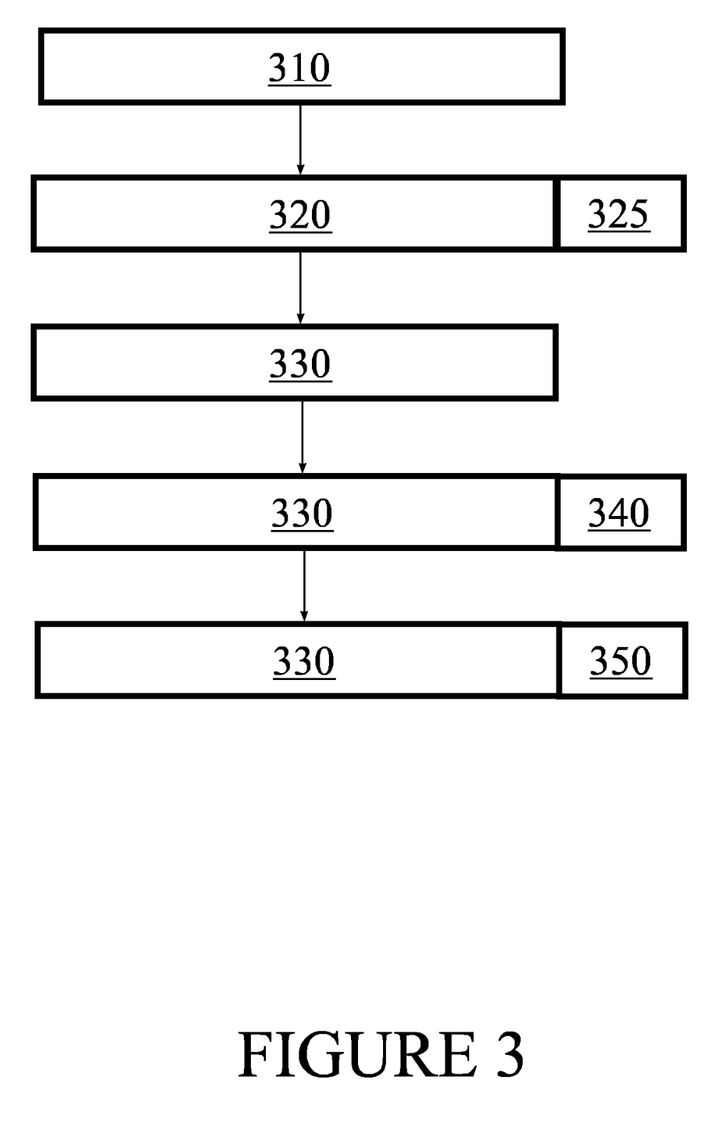
FIG. 3 illustrates securing downlink control information and CRC in accordance with at least some embodiments of the present invention.

FIG. 3 illustrates securing downlink control information and CRC in accordance with at least some embodiments of the present invention. In FIG. 3, DCI is denoted by 310, scrambling sequence generated by PLS is denoted by 320, scrambled DCI 310 is denoted by 330 and CRC of scrambled DCI 330 is denoted by 340, similarly as in FIG. 2. In addition, second scrambling sequence is denoted by 325 and scrambled CRC is denoted by 350 in FIG. 3.

FIG. 3 demonstrates two-step scrambling, wherein DCI 310 may be first scrambled using scrambling sequence generated by PLS 320, to get scrambled DCI 330, similarly as DCI 210 may be scrambled using scrambling sequence generated by PLS 220, to get scrambled DCI 230 in FIG. 2. In addition, CRC 340 may be scrambled to get scrambled CRC 350. CRC 340 may be scrambled upon calculating a CRC check value, or bits, for scrambled DCI 330 for example. In some embodiments, CRC 340 may be scrambled using another, second scrambling sequence 325, wherein second scrambling sequence 325 may not be generated using PLS. That is to say, second scrambling sequence may be different compared to the PLS key associated with first UE 110, i.e., a first scrambling sequence.

That is to say, second scrambling sequence 325 may not be a PLS generated parameter but second scrambling sequence 325 may be used together with a PLS key to provide additional flexibility for BS 130 to schedule the resource assignment of UE 110 and jamming resource assignment, i.e., the two transmissions. In addition, second scrambling sequence 325 may be used to provide extra security. For instance, CRC 340 may be scrambled using second scrambling sequence 325 on top of Radio Network Temporary Identifier, RNTI, similarly as defined in 3GPP standard specifications. In some embodiments, second scrambling sequence 325 may be known to BS 130 and both UEs, UE 110 and UE 120, or BS 130 and UE 110 only. Second scrambling 325 sequence may be preconfigured, e.g., like RNTI.

In some embodiments of the present invention, a PLS key associated with UE 110 may correspond to second scrambling sequence 325. That is to say, a set of second scrambling sequences 325 may exist and BS 130 may select one sequence 325 from the set of scrambling sequences 325, wherein the selected scrambling sequence 325 corresponds to the PLS key associated with UE 110. Thus there may be a one-to-one relation with the selected second scrambling sequence 325 and the PLS key associated with UE 110 such that same understanding about second scrambling sequence 325 is available at both, BS 130 and UE 110, and both may select same second scrambling sequence 325 based on the PLS key associated with UE 110. If the selected second scrambling sequence does not define valid DCI for a jamming transmission together with scrambled DCI 330, BS 130 may change second scrambling sequence 325, e.g., to another sequence from the set. BS 130 may then check again whether the changed second scrambling sequence defines valid DCI for a jamming transmission together with scrambled DCI 330.

In some embodiments of the present invention, CRC check with multiple second scrambling sequences 325 may be applied at the receiver side, such as at UE 110, to find a PLS key that matches to the used second scrambling sequence 325. Hence, BS 130 may have more flexibility as there may be multiple options for scrambled DCI 330, which further makes it easier to schedule a jamming resource, such as PDSCH or PUSCH, while also transmitting on the resource assigned for UE 110.

Figure 4:
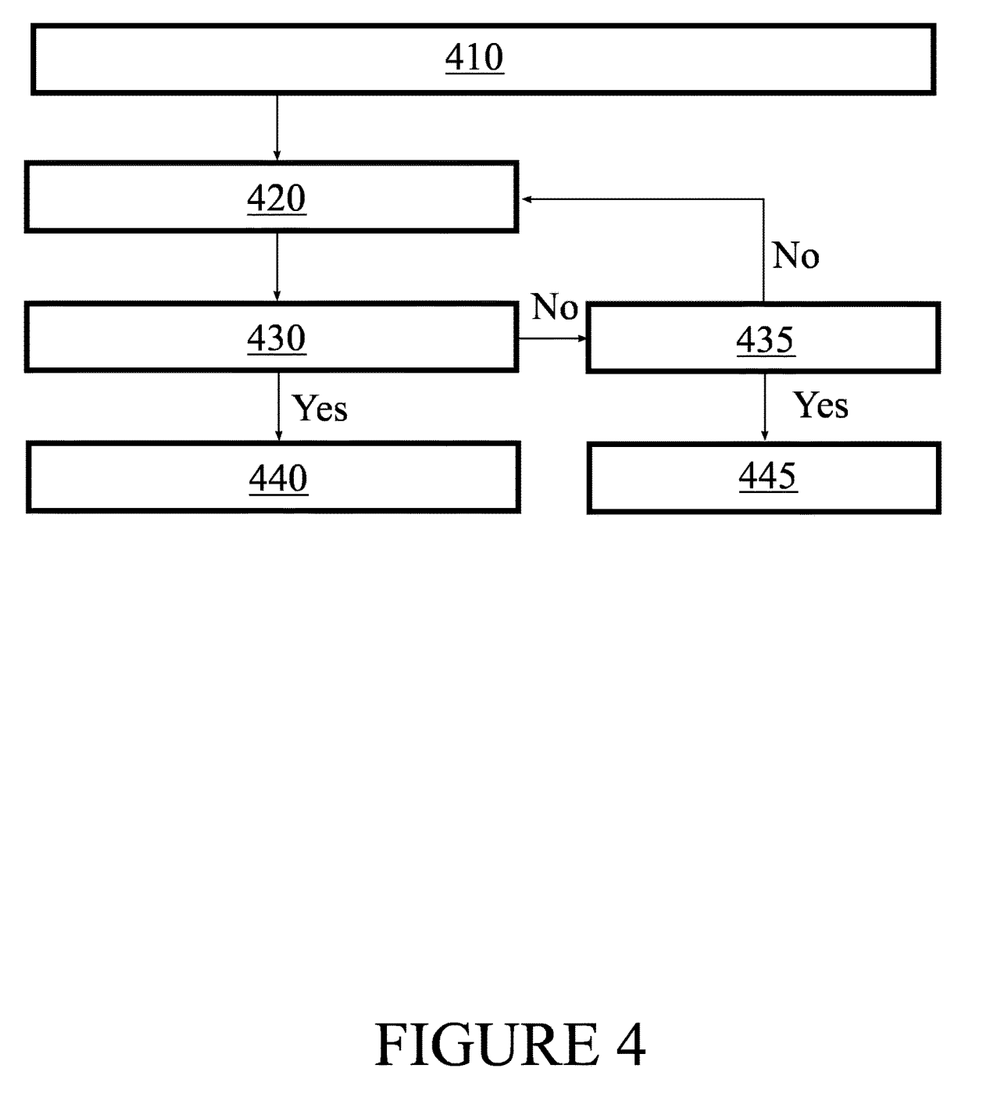
FIG. 4 illustrates an exemplary process in accordance with at least some embodiments of the present invention.

FIG. 4 illustrates an exemplary process in accordance with at least some embodiments of the present invention. The exemplary process may be performed by BS 130, such as a gNB, for example. In the beginning of the exemplary process BS 130 may determine that there is new data available to schedule to UE 110, i.e., for a downlink data transmission, and for example that UE 110 is capable of using PLS. Nevertheless, the exemplary process may be applied similarly if BS 130 determines that there is new data to schedule for a transmission from UE 110, i.e., for an uplink data transmission.

Upon determining that there is new data available for transmission to UE 110, BS 130 may, at step 410, decide about transmission parameters for a downlink control channel transmission, such as a PDCCH transmission. Said transmission parameters may comprise for example DCI format, aggregation level, etc., for the downlink control channel transmission. At step 420, BS 130 may consider scheduling information for the downlink data transmission, such as PDSCH scheduling information. The scheduling information may comprise for example a resource assignment of first UE 110, such as a time and a frequency resource. The scheduling information for the downlink data transmission may eventually decide exact content of a DCI, scrambled or not, to be transmitted.

At step 430, BS 130 may scramble the DCI of UE 110, such as DCI 210 in FIG. 1, using a PLS key associated with UE 110. BS 130 may also determine, at step 430, whether a resource for jamming, i.e., a jamming resource, may be assigned by BS 130 based on the scrambled DCI. That is to say, BS 130 may determine, based on the scrambled DCI, whether a jamming resource can be scheduled, wherein the scrambled DCI indicates the jamming resource, if for example decoded by an eavesdropper, such as second UE 120, without descrambling. BS 130 may determine that the scrambled DCI defines valid downlink control information by identifying a possibility to schedule another transmission, such as the jamming transmission, by BS 130.

For instance, BS 130 may determine whether the jamming resource may be assigned by checking whether the scrambled DCI of UE 110 indicates, or defines, valid DCI without descrambling. The valid DCI may for example indicate a time and a frequency resource controlled by BS 130. That is to say, BS 130 may check the scrambled DCI to determine whether the scrambled DCI, i.e., a scrambled version of at least one possible DCI of first UE 110, defines a valid DCI. BS 130 may for example check that the scrambled DCI defines a DCI in a correct format, such as in a format that is specified in 3GPP standard specifications.

If it is determined, at step 430, that the scrambled DCI does not indicate a valid DCI, BS 130 may decide not to schedule a jamming transmission based on the scrambled DCI and the exemplary process may proceed to step 435. At step 435, BS 130 may determine whether a maximum number of attempts is reached. If the maximum number of attempts has not been reached, the exemplary process may loop back to step 420. However, if it is determined at step 435 that the maximum number of attempts has been reached, the exemplary process may proceed to step 445.

At step 445, BS 130 may schedule first UE 110 with a resource and the resource may be indicated by a DCI of first UE 110, such as DCI 210 in FIG. 2, and the DCI of first UE 110 may be scrambled using a PLS key of first UE 110 for example, such as scrambling sequence 220 in FIG. 2, to generate a scrambled DCI of first UE 110, such as scrambled DCI 230 in FIG. 2. After that, BS 130 may perform control channel encoding and transmit in a downlink control channel transmission the encoded scrambled DCI only, without scheduling any jamming resource.

On the other hand, if it is determined, at step 430, that the scrambled DCI defines a valid DCI, e.g., if decoded but not descrambled by an eavesdropper, the exemplary process may proceed to step 440. At step 440, BS 130 may also schedule first UE 110 with a resource and the resource may be indicated by a DCI of first UE 110 and the DCI of first UE 110 may be scrambled using a PLS key associated with first UE 110 for example, to generate a scrambled DCI of first UE 110. After that, BS 130 may schedule the jamming transmission based on the scrambled DCI of first UE 110. BS 130 may perform control channel encoding and transmit in a downlink control channel transmission comprising the encoded scrambled DCI, wherein the scrambled DCI indicates a valid DCI, such as a resource for a jamming transmission, without descrambling by an eavesdropper.

That is to say, at steps 420-435, BS 130 may check multiple possibilities to make sure that it can schedule two transmissions, such as PDSCH transmissions, one with the scrambled DCI without descrambling and one also with actual DCI, i.e., with the scrambled DCI after descrambling. So if it is determined, at step 430, that the jamming resource cannot be scheduled, another resource, i.e., another DCI, may be assigned for first UE 110 if the process goes back to step 430 via steps 435 and 420. An indication about said another DCI may be scrambled using the PLS key associated with first UE 110. BS 130 may then determine, based on the scrambled indication about said another DCI, whether another valid DCI, i.e., a jamming transmission may be scheduled. If it is determined that said another valid DCI can be scheduled, BS 130 may transmit the scrambled another DCI. When both transmission may be scheduled, BS 130 may proceed to the next step, i.e., to step 440.

In some embodiments of the present invention, other PLS enhancements may be applied as well, on top of the embodiments presented herein.

Figure 5:
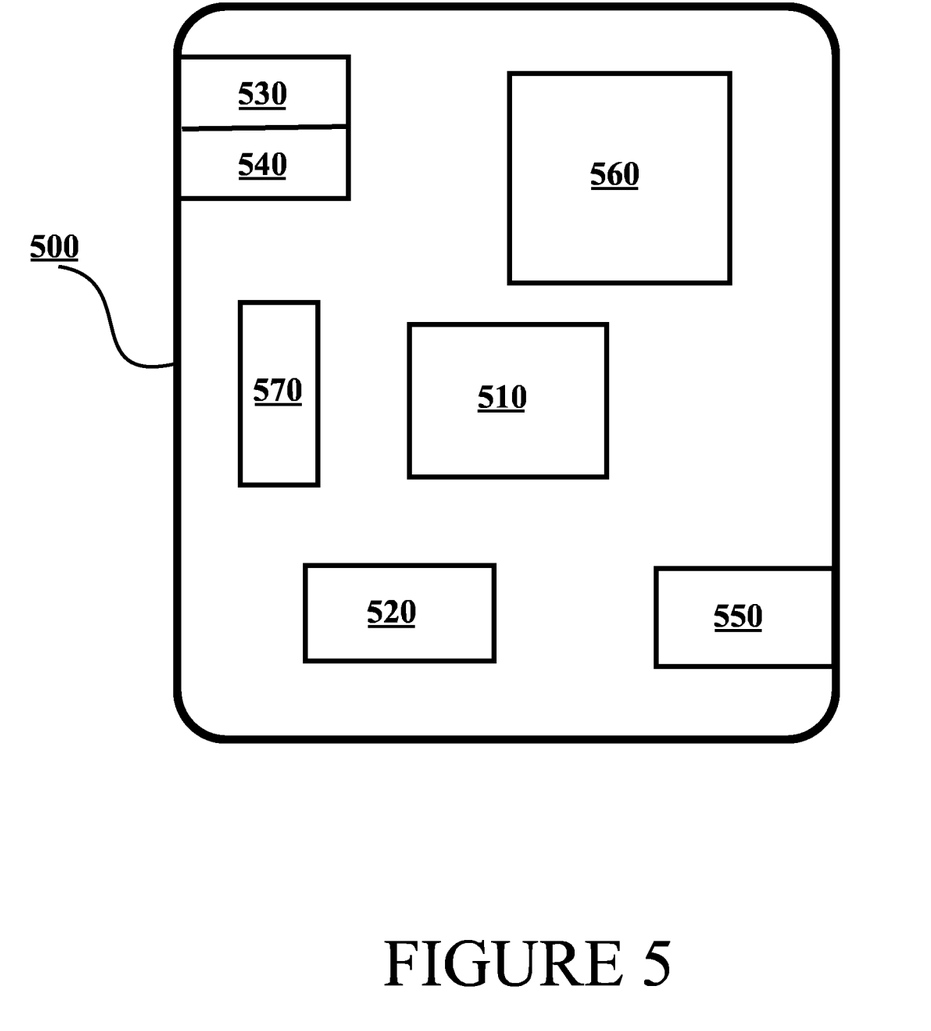
FIG. 5 illustrates an example apparatus capable of supporting at least some embodiments of the present invention.

FIG. 5 illustrates an example apparatus capable of supporting at least some embodiments of the present invention. Illustrated is device 500, which may comprise, for example, first UE 110 or BS 130 of FIG. 1, or device 500 may be configured to control the functioning thereof, possibly when installed therein. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. Processor 510 may comprise at least one application-specific integrated circuit, ASIC. Processor 510 may comprise at least one field-programmable gate array, FPGA. Processor 510 may be means for performing method steps in device 500. Processor 510 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with Global System for Mobile communication, GSM, Wideband Code Division Multiple Access, WCDMA, 5G/NR, Long Term Evolution, LTE, IS-95, Wireless Local Area Network, WLAN, Ethernet and/or Worldwide interoperability for Microwave Access, WiMAX, standards, for example.

Device 500 may comprise a near-field communication, NFC, transceiver 550. NFC transceiver 550 may support at least one NFC technology, such as NFC, Bluetooth, Wibree or similar technologies.

Device 500 may comprise user interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to accept incoming telephone calls, to originate telephone calls or video calls, to browse the Internet, to manage digital files stored in memory 520 or on a cloud accessible via transmitter 530 and receiver 540, or via NFC transceiver 550, and/or to play games.

Device 500 may comprise or be arranged to accept a user identity module 570. User identity module 570 may comprise, for example, a Subscriber Identity Module, SIM, card installable in device 500. A user identity module 570 may comprise information identifying a subscription of a user of device 500. A user identity module 570 may comprise cryptographic information usable to verify the identity of a user of device 500 and/or to facilitate encryption of communicated information and billing of the user of device 500 for communication effected via device 500.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. For example, where device 500 comprises a smartphone, it may comprise at least one digital camera. Some devices 500 may comprise a back-facing camera and a front-facing camera, wherein the back-facing camera may be intended for digital photography and the front-facing camera for video telephony. Device 500 may comprise a fingerprint sensor arranged to authenticate, at least in part, a user of device 500. In some embodiments, device 500 lacks at least one device described above. For example, some devices 500 may lack a NFC transceiver 550 and/or user identity module 570.

Processor 510, memory 520, transmitter 530, receiver 540, NFC transceiver 550, UI 560 and/or user identity module 570 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the present invention.

Figure 6:
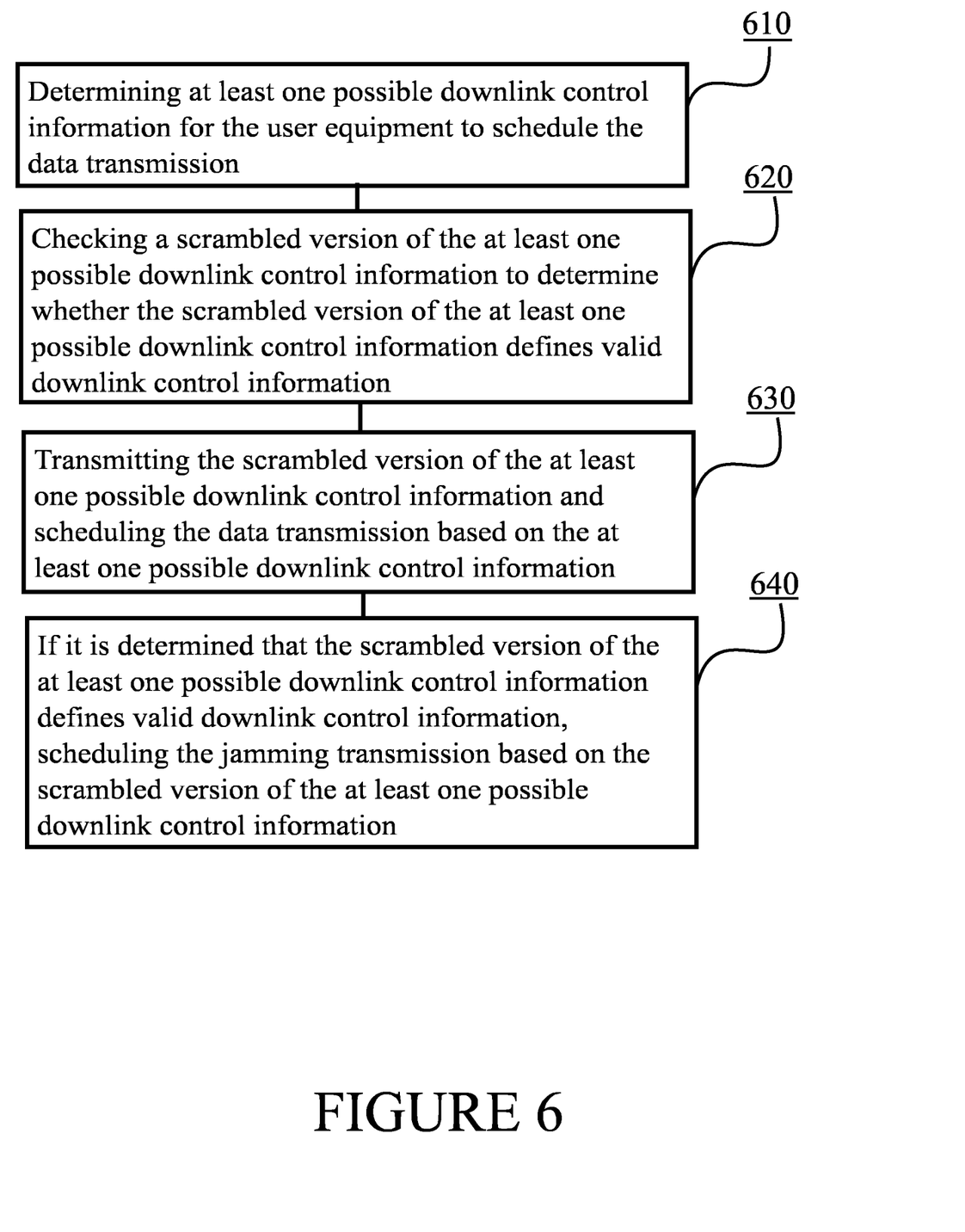
FIG. 6 illustrates a flow graph of a first method in accordance with at least some embodiments of the present invention.

FIG. 6 is a flow graph of a first method in accordance with at least some embodiments of the present invention. The phases of the illustrated first method may be performed by a BS, such as BS 130, or by a control device configured to control the functioning thereof, possibly when installed therein. The first method may be for using a single downlink control channel transmission to schedule a data transmission for a user equipment and a jamming transmission for an eavesdropper.

The first method may comprise, at step 610, determining at least one possible downlink control information for the user equipment to schedule the data transmission. The first method may also comprise, at step 620, checking a scrambled version of the at least one possible downlink control information to determine whether the scrambled version of the at least one possible downlink control information defines valid downlink control information. In addition, the first method may comprise, at step 630, transmitting the scrambled version of the at least one possible downlink control information and scheduling the data transmission based on the at least one possible downlink control information. Finally, the first method may comprise, at step 640, if it is determined that the scrambled version of the at least one possible downlink control information defines valid downlink control information, scheduling the jamming transmission based on the scrambled version of the at least one possible downlink control information.

Figure 7:
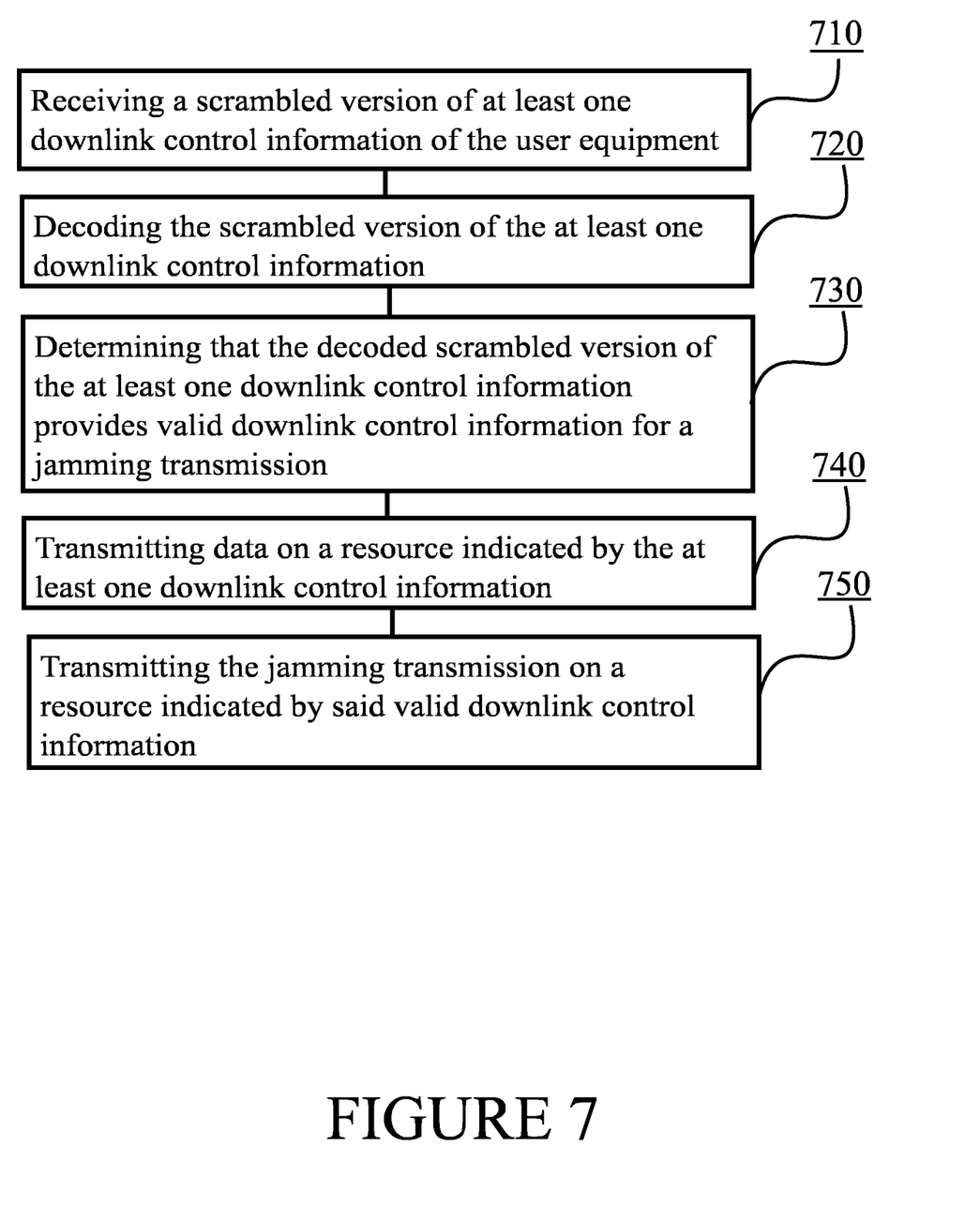
FIG. 7 illustrates a flow graph of a second method in accordance with at least some embodiments of the present invention.

FIG. 7 is a flow graph of a second method in accordance with at least some embodiments of the present invention. The phases of the illustrated second method may be performed by a UE, such as first UE 110, or by a control device configured to control the functioning thereof, possibly when installed therein.

The second method may comprise, at step 710, receiving a scrambled version of at least one downlink control information of the user equipment. The second method may also comprise, at step 720, decoding the scrambled version of the at least one downlink control information. At step 730, the first method may comprise determining that the decoded scrambled version of the at least one downlink control information provides valid downlink control information for a jamming transmission. In addition, the second method may comprise, at step 740, transmitting data on a resource indicated by the at least one downlink control information. Finally, the second method may comprise, at step 750, transmitting the jamming transmission on a resource indicated by said valid downlink control information.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

In an exemplary embodiment, an apparatus, such as, for example, first UE 110 or BS 130, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, first UE 110 or BS 130, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in communication networks, wherein secure transmission over air interface is required, such as in networks operating in accordance with 3GPP standards.

Acronyms List

3GPP 3rd Generation Partnership Project
BS Base Station
CRC Cyclic Redundancy Check
CSI Channel State Information
DCI Downlink Control Information
FDD Frequency Division Duplexing
GSM Global System for Mobile communication
IMSI International Mobile Subscriber Identity
IoT Internet of Things
LTE Long-Term Evolution
M2M Machine-to-Machine
MTC Machine-Type Communications
NFC Near-Field Communication
PLS Physical Layer Security
NR New Radio
PDCCH Physical Downlink Control Channel
PDSCH Physical Downlink Shared Channel
PUSCH Physical Uplink Shared Channel
RAT Radio Access Technology
RNTI Radio Network Temporary Identifier
SIM Subscriber Identity Module
UE User Equipment
UI User Interface
WCDMA Wideband Code Division Multiple Access
WiMAX Worldwide Interoperability for Microwave Access
WLAN Wireless Local Area Network

REFERENCE SIGNS LIST

| | |
|---|---|
| 110 | First UE, e.g., a legitimate receiver or transmitter |
| 120 | Second UE, e.g., an eavesdropper |
| 130 | Base Station |
| 115, 135 | Interfaces |
| 140 | Core network |
| 210, 310 | DCI of first UE 110 |
| 220, 320 | Scrambling sequence of PLS key |
| 230, 330 | Scrambled DCI |
| 240, 340 | CRC |
| 350 | Scrambled CRC |
| 410-445 | Process steps in FIG. 4 |
| 500-570 | Structure of the apparatus of FIG. 5 |
| 610-640 | Phases of the first method of FIG. 6 |
| 710-750 | Phases of the second method of FIG. 7 |

The invention claimed is:

1. A method for a base station, for using a single downlink control channel transmission to schedule a data transmission for a user equipment and a jamming transmission for an eavesdropper, comprising:
   determining at least one possible downlink control information for the user equipment to schedule the data transmission;
   checking a scrambled version of the at least one possible downlink control information to determine whether the scrambled version of the at least one possible downlink control information defines valid downlink control information without descrambling;
   transmitting the scrambled version of the at least one possible downlink control information and scheduling the data transmission based on the at least one possible downlink control information; and
   when it is determined that the scrambled version of the at least one possible downlink control information defines valid downlink control information, scheduling the jamming transmission based on the scrambled version of the at least one possible downlink control information,
   the method further comprising:
   scrambling the at least one possible downlink control information using a physical layer security key associated with the user equipment, wherein the physical layer security key used for encryption is based at least on a transmission channel, a direction of arrival/departure, a transmit/receive beam index, and pathloss, wherein the physical layer security key associated with the user equipment is derived based on the transmission channel between the user equipment and the base station.

2. The method according to claim 1, wherein the scrambled version of the at least one possible downlink control information indicates at least a resource assignment for the user equipment after descrambling, and wherein said valid downlink control information defined with the scrambled downlink control information comprises at least a resource assignment for the jamming transmission,
   wherein the jamming resource is a combination of a time and a frequency resource controlled by the base station,
   wherein the base station determines, based on the scrambled downlink control information whether a jamming resource can be scheduled.

3. The method according to claim 1, wherein:
   wherein the physical layer security key of the user equipment is derived at both the user equipment and the base station, independently, by assuming reciprocity of the transmission channel between the user equipment and the base station,
   wherein the physical layer security key associated with user equipment further corresponds to a second scrambling sequence to form a set of scrambling sequences,
   wherein the base station selects one sequence from the set of scrambling sequences, wherein the selected scrambling sequence corresponds to the physical layer security key associated with the user equipment.

4. The method according to claim 1, further comprising:
   when it is determined that the scrambled version of the at least one possible downlink control information does not define valid downlink control information, deciding not to schedule the jamming transmission based on the scrambled version of the at least one downlink control information.

5. The method according to claim 1, wherein the valid downlink control information indicates at least a time and a frequency resource controlled with the base station.

6. The method according to claim 1, further comprising:
when it is determined that the scrambled version of the at least one downlink control information does not indicate valid downlink control information, assigning another possible downlink control information for the user equipment;
checking a scrambled version of said another possible downlink control information to determine whether the scrambled version of said another possible downlink control information defines another valid downlink control information; and
transmitting the scrambled version of said another possible downlink control information for the user equipment and scheduling the data transmission based on said another possible downlink control information.

7. The method according to claim 1, further comprising:
transmitting data to the user equipment on a resource indicated with the at least one possible downlink control information for the user equipment; and
transmitting a jamming message on a resource indicated with said valid downlink control information.

8. The method according to claim 1, further comprising:
receiving a data transmission on a resource indicated with the at least one possible downlink control information for the user equipment; and
identifying a security threat based on a transmission received on a resource indicated with said valid downlink control information.

9. The method according to claim 1, further comprising:
scrambling the at least one possible downlink control information using a first scrambling sequence to get the scrambled version of the at least one possible downlink control information; and
scrambling cyclic redundancy check bits of the scrambled version of the at least one possible downlink control information using a second scrambling sequence.

10. The method according to claim 9, further comprising:
selecting the second scrambling sequence from a set of sequences, wherein the set of sequences corresponds to the physical layer security key associated with the user equipment.

11. The method according to claim 1, further comprising:
changing the second scrambling sequence when the selected second scrambling sequence does not define said valid downlink control information together with the scrambled downlink control information.

12. The method according to claim 1, further comprising:
determining that the scrambled version of the at least one possible downlink control information for the user equipment defines valid downlink control information with identifying a possibility to schedule another transmission with the base station.

13. An apparatus comprising:
at least one processing core, and
at least one non-transitory memory including computer program code,
the at least one memory and the computer program code being configured to, with the at least one processing core, cause the apparatus at least to perform:
determine at least one possible downlink control information for a user equipment to schedule the data transmission;
check a scrambled version of the at least one possible downlink control information to determine whether the scrambled version of the at least one possible downlink control information defines valid downlink control information without descrambling;
transmit the scrambled version of the at least one possible downlink control information and schedule the data transmission based on the at least one possible downlink control information; and
schedule the jamming transmission based on the scrambled version of the at least one possible downlink control information when it is determined that the scrambled version of the at least one possible downlink control information defines valid downlink control information,
wherein the at least one memory and the computer program code are further configured to, with the at least one processing core, cause the apparatus at least to perform:
scrambling the at least one possible downlink control information using a physical layer security key associated with the user equipment, wherein the physical layer security key used for encryption is based at least on a transmission channel, a direction of arrival/departure, a transmit/receive beam index, and pathloss,
wherein the physical layer security key associated with the user equipment is derived based on the transmission channel between the user equipment and the base station.

14. The apparatus according to claim 13, wherein the scrambled version of the at least one possible downlink control information indicates at least a resource assignment for the user equipment after descrambling, and said valid downlink control information defined with the scrambled downlink control information comprises at least a resource assignment for the jamming transmission.

15. The apparatus according to claim 13, wherein the physical layer security key of the user equipment is derived at both the user equipment and the base station, independently, by assuming reciprocity of the transmission channel between the user equipment and the base station,
wherein the physical layer security key associated with user equipment further corresponds to a second scrambling sequence to form a set of scrambling sequences,
wherein the base station selects one sequence from the set of scrambling sequences, wherein the selected scrambling sequence corresponds to the physical layer security key associated with the user equipment.

16. The apparatus according to claim 13, wherein the at least one memory and the computer program code are configured to, with the at least one processing core, cause the apparatus to:
when it is determined that the scrambled version of the at least one possible downlink control information does not define valid downlink control information, decide not to schedule the jamming transmission based on the scrambled version of the at least one downlink control information.

17. An apparatus comprising:
at least one processing core, and
at least one non-transitory memory including computer program code,
the at least one memory and the computer program code being configured to, with the at least one processing core, cause the apparatus at least to perform:
receive a scrambled version of at least one downlink control information of a user equipment;
decode the scrambled version of the at least one downlink control information;

determine that the decoded scrambled version of the at least one downlink control information provides valid downlink control information for a jamming transmission without descrambling;

transmit data on a resource indicated with the at least one downlink control information; and transmit the jamming transmission on a resource indicated with said valid downlink control information, wherein the at least one memory and the computer program code being are further configured to, with the at least one processing core, cause the apparatus at least to perform:

scrambling the at least one possible downlink control information using a physical layer security key associated with the user equipment, wherein the physical layer security key used for encryption is based at least on a transmission channel, a direction of arrival/departure, a transmit/receive beam index, and pathloss, wherein the physical layer security key associated with the user equipment is derived based on the transmission channel between the user equipment and the base station.

18. The apparatus according to claim 17, wherein the at least one memory and the computer program code are configured to, with the at least one processing core, cause the apparatus to:

descramble, after said decoding, the scrambled version of the at least one downlink control information to determine the at least one downlink control information.

19. The apparatus according to claim 17, wherein the at least one memory and the computer program code are configured to, with the at least one processing core, cause the apparatus to:

descramble the scrambled version of at least one downlink control information of the user equipment using a physical layer security key associated with the user equipment:

recover the descrambled version at least one downlink control information of the user equipment and identify a resource indicated by the scrambled version at least one downlink control information of the user equipment after decoding and descrambling;

receive data from the base station on the resource indicated by the descrambled version at least one downlink control information of the user equipment and decode a correct downlink shared channel transmission from the base station, wherein the apparatus communicates with the base station on the resource indicated by the descrambled version at least one downlink control information of the user equipment.

20. The apparatus according to claim 19, wherein only a part of at least one downlink control information of the user equipment is scrambled using the physical layer security key associated with the user equipment to generate scrambled at least one downlink control information of the user equipment and scrambled at least one downlink control information of the user equipment comprises a part which is not scrambled.

* * * * *